(12) United States Patent
El Idrissi et al.

(10) Patent No.: US 9,827,835 B2
(45) Date of Patent: Nov. 28, 2017

(54) DRIVING ASSISTANCE DEVICE AND METHOD

(71) Applicant: Valeo Vision, Bobigny (FR)

(72) Inventors: Hafid El Idrissi, Pantin (FR); Kostadin Beev, Emerainville (FR); David Hue, Butry sur Oise (FR); Steed Gratien, Hacheres (FR); Marc Rocklinger, Bonne (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/916,680

(22) PCT Filed: Sep. 26, 2014

(86) PCT No.: PCT/EP2014/070688
§ 371 (c)(1),
(2) Date: Mar. 4, 2016

(87) PCT Pub. No.: WO2015/044384
PCT Pub. Date: Apr. 2, 2015

(65) Prior Publication Data
US 2016/0214467 A1    Jul. 28, 2016

(30) Foreign Application Priority Data
Sep. 26, 2013  (FR) ..................................... 13 59280

(51) Int. Cl.
*G02F 1/153*      (2006.01)
*B60J 3/04*       (2006.01)
(52) U.S. Cl.
CPC ...................................... *B60J 3/04* (2013.01)

(58) Field of Classification Search
CPC ..... B60J 3/04; B60J 3/02; B60J 3/0208; B60J 3/0239; B60J 3/0282; B60J 3/0204; Y02T 10/88; B60W 30/09; B60W 40/02; G02F 2001/1515; G02F 1/1533; G02F 1/0018; G02F 1/133536; G02F 2203/09;
(Continued)

(56) References Cited

U.S. PATENT DOCUMENTS 3,199,114 A  *  8/1965  Malifaud ................... B60J 3/02
                                                  296/97.2
3,961,181 A  *  6/1976  Golden ...................... B60J 3/04
                                                  250/208.2
(Continued)

FOREIGN PATENT DOCUMENTS

DE       102012008913 A    11/2012

*Primary Examiner* — Jelani Smith
*Assistant Examiner* — Luis A Martinez Borrero
(74) *Attorney, Agent, or Firm* — Jacox, Meckstroth & Jenkins

(57) ABSTRACT

A device for assisting in the driving of a motor vehicle, comprising a screen with variable transmission intended to be arranged between a road scene in front of the vehicle and a driver of the vehicle, the device comprising a number of sensors suitable for recovering data representative of the environment in which the vehicle is located, the device being configured to drive a transmission coefficient of the screen with variable transmission, wherein the device is configured to take into account the data recovered by the sensors and to compute the transmission coefficient by combining the data.

18 Claims, 4 Drawing Sheets

(58) Field of Classification Search
CPC ........ G02F 2203/01; G02B 2027/0112; G02B 2027/012; G02B 2027/013; G02B 2207/101; G02B 27/46
USPC .......... 701/1, 408, 49, 70, 93; 359/630, 631, 359/900
See application file for complete search history.

(56) References Cited

U.S. PATENT DOCUMENTS

| | | | | |
|---|---|---|---|---|
| 4,286,308 A * | 8/1981 | Wolff | B60Q 1/14 | 362/19 |
| 4,848,890 A * | 7/1989 | Horn | G02C 7/101 | 351/158 |
| 4,973,132 A * | 11/1990 | McDonald | G02B 5/3066 | 359/13 |
| 5,258,607 A * | 11/1993 | Agostini | A42B 3/226 | 250/201.1 |
| 5,276,539 A * | 1/1994 | Humphrey | A61B 3/063 | 349/116 |
| 5,486,938 A * | 1/1996 | Aigrain | B60Q 1/14 | 349/116 |
| 5,497,271 A * | 3/1996 | Mulvanny | B60K 37/02 | 345/7 |
| 5,671,035 A * | 9/1997 | Barnes | G02C 7/101 | 351/158 |
| 5,859,735 A * | 1/1999 | De Vries | G02B 5/23 | 313/478 |
| 6,262,848 B1 * | 7/2001 | Anderson | G02B 27/0101 | 359/630 |
| 6,384,982 B1 * | 5/2002 | Spitzer | G02B 27/017 | 359/630 |
| 6,424,448 B1 * | 7/2002 | Levy | G02B 23/18 | 359/237 |
| 6,481,851 B1 * | 11/2002 | McNelley | G02B 27/2292 | 345/5 |
| 6,493,128 B1 * | 12/2002 | Agrawal | B32B 17/10036 | 244/129.3 |
| 6,557,995 B1 * | 5/2003 | Edwards | G02C 7/16 | 351/44 |
| 6,568,738 B1 * | 5/2003 | Braun | B60Q 3/72 | 296/97.2 |
| 6,750,832 B1 * | 6/2004 | Kleinschmidt | B60K 35/00 | 345/7 |
| 6,864,927 B1 * | 3/2005 | Cathey | G02B 27/01 | 349/11 |
| 7,134,707 B2 * | 11/2006 | Isaac | B60J 3/04 | 296/97.2 |
| 7,224,325 B2 * | 5/2007 | Nagano | G02B 27/0101 | 345/7 |
| 7,600,903 B2 * | 10/2009 | Mensales | B60Q 1/076 | 362/507 |
| 7,874,666 B2 * | 1/2011 | Xu | G02C 7/101 | 2/15 |
| 7,970,172 B1 * | 6/2011 | Hendrickson | B60J 3/04 | 280/735 |
| 8,888,304 B2 * | 11/2014 | Beckman | G02B 27/0101 | 296/97.2 |
| 9,097,890 B2 * | 8/2015 | Miller | G02B 27/0093 | |
| 9,097,891 B2 * | 8/2015 | Border | G02B 27/0093 | |
| 9,111,498 B2 * | 8/2015 | Border | G09G 3/3611 | |
| 9,186,963 B2 | 11/2015 | Tewari et al. | | |
| 9,235,099 B2 * | 1/2016 | Lam | G02B 5/23 | |
| 9,505,290 B2 * | 11/2016 | Fleury | B60J 3/04 | |
| 9,511,650 B2 * | 12/2016 | Momot | B60J 3/04 | |
| 9,519,149 B2 * | 12/2016 | Lee | G02B 27/0179 | |
| 9,601,083 B2 * | 3/2017 | Ramanathan | G09G 5/10 | |
| 9,623,728 B2 * | 4/2017 | Fleury | B60Q 1/143 | |
| 9,676,324 B2 * | 6/2017 | Hue | B60Q 1/50 | |
| 2002/0196201 A1 * | 12/2002 | Rosen | B60K 35/00 | 345/7 |
| 2004/0228137 A1 * | 11/2004 | Mensales | B60Q 1/076 | 362/507 |
| 2005/0040333 A1 * | 2/2005 | Fleury | G02B 23/12 | 250/332 |
| 2006/0140502 A1 * | 6/2006 | Tseng | B60J 3/04 | 382/275 |
| 2006/0164219 A1 * | 7/2006 | Knoll | B60Q 9/008 | 340/435 |
| 2006/0175859 A1 * | 8/2006 | Isaac | B60J 3/04 | 296/97.4 |
| 2006/0184297 A1 * | 8/2006 | Higgins-Luthman | B60R 1/00 | 701/41 |
| 2010/0065721 A1 * | 3/2010 | Broude | B60J 3/04 | 250/201.1 |
| 2011/0072961 A1 * | 3/2011 | Jungkuist | E06B 3/6621 | 89/36.02 |
| 2011/0233384 A1 * | 9/2011 | Wu | B60J 3/04 | 250/208.2 |
| 2012/0019891 A1 * | 1/2012 | Dewell | G02F 1/163 | 359/275 |
| 2012/0044560 A9 * | 2/2012 | Lam | G02B 5/23 | 359/241 |
| 2012/0126099 A1 | 5/2012 | Tewari et al. | | |
| 2012/0303214 A1 * | 11/2012 | Yuter | B60J 3/04 | 701/36 |
| 2013/0131922 A1 * | 5/2013 | Ogata | B60Q 1/143 | 701/36 |
| 2013/0300911 A1 * | 11/2013 | Beckman | G02B 27/0101 | 348/335 |
| 2014/0153076 A1 * | 6/2014 | Tewari | B60J 3/04 | 359/238 |
| 2014/0203166 A1 * | 7/2014 | Betz | F21S 11/007 | 250/201.1 |
| 2015/0062469 A1 * | 3/2015 | Fleury | B60J 3/04 | 349/14 |
| 2015/0077826 A1 * | 3/2015 | Beckman | G02B 27/01 | 359/238 |
| 2015/0083897 A1 * | 3/2015 | Fleury | B60J 3/04 | 250/214 AL |
| 2015/0088385 A1 * | 3/2015 | Fleury | B60J 3/04 | 701/48 |
| 2016/0077400 A1 * | 3/2016 | Lam | G02B 5/23 | 359/241 |
| 2016/0091159 A1 * | 3/2016 | Puech | F21S 48/125 | 362/509 |
| 2016/0202497 A1 * | 7/2016 | Hue | G02C 7/101 | 349/14 |
| 2016/0207452 A1 * | 7/2016 | Hue | B60J 3/04 | |
| 2016/0207457 A1 * | 7/2016 | Border | G02B 27/0172 | |
| 2016/0209666 A1 * | 7/2016 | Hue | G02B 27/26 | |
| 2016/0216514 A1 * | 7/2016 | Hue | G02B 27/017 | |
| 2016/0216536 A1 * | 7/2016 | Hue | B60J 3/04 | |
| 2016/0223816 A1 * | 8/2016 | Hue | G02B 5/30 | |
| 2016/0347238 A1 * | 12/2016 | Hue | B60Q 1/1423 | |
| 2016/0357014 A1 * | 12/2016 | Beckman | B60J 3/02 | |
| 2017/0001553 A1 * | 1/2017 | Hue | B60J 3/0291 | |
| 2017/0023792 A1 * | 1/2017 | El Idrissi | G02B 27/0172 | |
| 2017/0023802 A1 * | 1/2017 | El Idrissi | G02C 7/104 | |
| 2017/0089536 A1 * | 3/2017 | Courcier | F21S 48/12 | |
| 2017/0114976 A1 * | 4/2017 | Beev | F21S 48/1241 | |

\* cited by examiner

DRIVING ASSISTANCE DEVICE AND METHOD

CROSS-REFERENCE TO RELATED APPLICATIONS

This application is the U.S. National Phase application of PCT Application No. PCT/EP2014/070688 filed Sep. 26, 2014, which claims priority to the French application 1359280 filed on Sep. 26, 2013, which applications are incorporated herein by reference and made a part hereof.

BACKGROUND OF THE INVENTION

1. Field of the Invention

The invention relates to a device and a method for assisting in the driving of a motor vehicle.

The present invention relates to the methods and the devices intended to provide assistance in the driving of motor vehicles, particularly when the outside brightness or variations of outside brightness may disturb the driving of the driver.

2. Description of the Related Art

While the vehicle is moving, the driver of a vehicle has to permanently look outside the vehicle to be warned of any danger likely to provoke an accident. Now, the vision of the driver is regularly disturbed by the outside brightness, whether from glare due to the sun, due to the lights of an oncoming vehicle or of a following vehicle, or even by abrupt variation of brightness as when entering or leaving a tunnel.

In order to improve the comfort and the safety of the driver, a number of solutions have been proposed. One of them consists in using a screen with variable transmission, in the form for example of spectacles worn by the driver, the transparency of which varies as a function of a transmission coefficient applied to the screen. The computation of this coefficient is for example performed from a measurement of brightness by a single sensor situated on the vehicle. Thus, the transmission coefficient is adapted to the ambient brightness detected by the sensor to set the transparency of the screen with variable transmission.

Nevertheless, this solution does not make it possible to adapt the transmission coefficient to enough situations that can be encountered by the vehicle and which require a particular processing. For example, when a strong light source dazzles the driver, the screen with variable transmission will reduce its transparency and therefore lessen the vision of the driver to prevent the glare. Nevertheless, in this case, if the driver looks at another area of the road that is darker, the reduced transparency of the screen with variable transmission will reduce his or her visibility in this darker area even though a pedestrian or a traffic light that the driver will not see or may barely see may be situated in this area. The danger represented by such a situation will easily be understood.

The invention aims to mitigate at least some of the drawbacks of the known driving assistance devices and methods.

SUMMARY OF THE INVENTION

For this, the invention relates to a device for assisting in the driving of a motor vehicle, comprising a screen with variable transmission intended to be arranged between a road scene in front of the vehicle and a driver of the vehicle, the device comprising a number of sensors suitable for recovering data representative of the environment in which the vehicle is located, the device being configured to drive a transmission coefficient of the screen with variable transmission, wherein the device is configured to take account of the data recovered by the sensors and to compute the transmission coefficient by combining the data.

A device according to the invention therefore makes it possible to rely on a plurality of data to allow for the adjustment of the transmission coefficient by the combination of these data, and not to take account only of a single datum. Thus, the screen with variable transmission has a transparency which adapts to the context represented by the various data from the various sensors. For example, if one sensor detects a strong brightness originating from an oncoming vehicle, but another sensor detects that the gaze of the driver is directed toward another point, it is not necessary to reduce the transparency of the screen with variable transmission, all the more so as this reduction of the transparency of the screen with variable transmission could provoke a reduction of the vision of the driver even though his or her gaze is directed toward an area in which a danger may be located, such as another vehicle in an intersection, a traffic light, a pedestrian crossing the road, etc.

Advantageously and according to the invention, the sensors are suitable for recovering the data representative of the environment out of one or more of the following types of data:
  The atmospheric conditions such as:
    rain, wind, snow, mist, etc. . . .
    the time of day
    etc. . . .
  The road environment such as
    the state of the ground,
    the glare from another vehicle or from a fixed light source,
    the nature of the road (bend, tunnel, highway, etc.)
    the geolocation,
    the speed of the vehicle,
    etc. . . .
  The environment of the driver such as:
    the orientation of his or her head,
    the orientation of his or her gaze,
    etc. . . .
this list being neither limiting nor exhaustive, numerous other data being able to be used.

According to this aspect of the invention, one or more of these types of data are used to best compute the optimum transmission coefficient to be applied to the screen with variable transmission.

Advantageously and according to the invention, the device is suitable for determining a situation in which the vehicle and/or the driver is located from all or part of the recovered data.

According to this aspect of the invention, the situation is selected from a number of predetermined types of situation that it is important to take into account for the computation of the transmission coefficient. For example, the situations combine one or more of the following alternatives describing the context in which the vehicle is located: driving in daytime or nighttime, sunny, cloudy or rainy weather, town or country driving, passage into a tunnel or not, etc. A situation will for example be able to be the following combination: town driving in daytime in cloudy weather. The situations can also characterize intermediate states or degrees of variations of these simple combinations, such as, for example light rain/heavy rain, dawn/twilight, etc.

Advantageously and according to the invention, the device is suitable for determining the situation from data recovered out of the following data:
  the atmospheric conditions,
  the road environment,
  the environment of the driver;
this list being neither limiting nor exhaustive, numerous other data being able to be used.

According to this aspect of the invention, the device uses one or more of these information items to determine the situation in which the vehicle is located. For example, and in conjunction with the example of the preceding paragraph, driving in daytime in a town in cloudy weather will be determined by virtue of the geolocation data for town driving, by virtue of the time band data for daytime driving and by virtue of the weather conditions data for the cloudy weather. All of these data therefore make it possible to determine a situation.

Advantageously and according to the invention, the device is configured to assign a weight to all or part of the recovered data as a function of the situation of the vehicle and to weight the data by their corresponding weight in the computation of the transmission coefficient.

According to this aspect of the invention, the assignment of weights to the recovered data as a function of the determined situation of the vehicle allows for a computation of the transmission coefficient taking into account the weight of the data and therefore allowing for a computation of the transmission coefficient best suited to the determined situation. In effect, as a function of the determined situation, some data have more importance in the computation of the transmission coefficient.

Advantageously and according to the invention, a first of the sensors is a sensor configured to measure a brightness in the axis of the vehicle and a second of the sensors is a sensor configured to measure a brightness in another direction, the device being configured to take account of the orientation of the head of the driver and perform the computation as a function of the data recorded by the first and the second sensors and as a function of the orientation of the head.

According to this aspect of the invention, the device comprises, among its sensors, at least two brightness sensors, one being configured to measure the brightness in the axis of the vehicle so as, for example, to detect a glare provoked by the lighting of an oncoming vehicle. The device takes into account the orientation of the gaze of the driver and weights the brightness data recorded by the two sensors accordingly: for example, if the driver is looking in a direction corresponding to the axis of the vehicle, the data from the sensor directed in this axis will be predominant over the data originating from the second sensor in the computation of the transmission coefficient of the screen with variable transmission. On the other hand if the driver is looking mainly in the direction of the second sensor, the data from the latter will be predominant in the computation of the transmission coefficient of the screen with variable transmission. Between these two directions, the device will be able to assign intermediate weights to the data according to the orientation of the gaze of the driver.

Advantageously and according to the invention, the screen with variable transmission comprises spectacles and the second sensor is situated on the spectacles.

According to this aspect of the invention, the second sensor is situated as close as possible to the eyes of the driver and therefore give accurate information on the brightness which reaches him or her. Thus, for example, if the driver looks in a direction other than the axis of the vehicle, the data from the second sensor will be predominant in the computation of the transmission coefficient: these data are those received as close as possible to the view of the driver, and therefore enable him or her for example to keep a clear view if he or she looks to the side, to check for example for the presence of a pedestrian crossing the road, a traffic light or else a vehicle coming from an intersection.

Advantageously and according to the invention, the device comprises a pulsed lighting, the device being configured to drive the pulsed lighting, in a first mode in synchronism with the transmission coefficient, and, in a second mode, independently of the coefficient.

The invention relates also to a method for assisting in the driving of a motor vehicle, the vehicle being equipped with a screen with variable transmission intended to be arranged between a road scene in front of the vehicle and a driver of the vehicle, the method comprising a step of recovery of data representative of the environment in which the vehicle is located, and a step of driving a transmission coefficient of the screen with variable transmission, wherein the method comprises a step of taking into account of the data recovered in the recovery piece of step and a step of computation of the transmission coefficient by combination of the data.

A method according to the invention therefore makes it possible to rely on a number of types of data to make it possible to adjust the transmission coefficient by combination of these data, and not take into account only a single recovered piece of data.

Advantageously and according to the invention, the data representative of the environment are chosen from one or more of the following types of data:
  The atmospheric conditions such as:
    rain, wind, snow, mist, etc. . . .
    the time of day
    etc. . . .
  The road environment such as
    the state of the ground,
    the glare from another vehicle or from a fixed light source,
    the nature of the road (bend, tunnel, highway, etc. . . .),
    the geolocation,
    the speed of the vehicle,
    etc. . . .
  The environment of the driver such as:
    the orientation of his or her head,
    the orientation of his or her gaze,
    etc. . . .
this list being neither limiting nor exhaustive, numerous other data being able to be used.

Advantageously and according to the invention, the method comprises a step of determination of a situation in which the vehicle is located from the recovered data.

Advantageously and according to the invention, the step of determination of the situation is performed on the basis of the data recovered out of the following data:
  the atmospheric conditions,
  the road environment,
  the environment of the driver;
this list being neither limiting nor exhaustive, numerous other data being able to be used.

Advantageously and according to the invention, the method comprises a step of assignment of a weight to all or part of the recovered data as a function of the situation of the vehicle and in that it comprises a step of weighting of the data by their corresponding weight for the computation of the transmission coefficient.

Advantageously and according to the invention, the method comprises a step of recovery of brightness data in the axis of the vehicle and in another direction and a step of detection of the orientation of the head of the driver. Furthermore, the computation step is performed by taking into account the brightness data as a function of the orientation of the head.

Advantageously and according to the invention, the method comprises a first step driving a pulsed lighting of the vehicle, in synchronism with the driving of the transmission coefficient, and a second step of driving the lighting independently of the latter driving of the transmission coefficient.

These and other objects and advantages of the invention will be apparent from the following description, the accompanying drawings and the appended claims.

BRIEF DESCRIPTION OF THE ACCOMPANYING DRAWINGS

Other aims, features and advantages of the invention will become apparent on reading the following description given in a purely nonlimiting manner and which refers to the attached figures in which.

Figure 7:
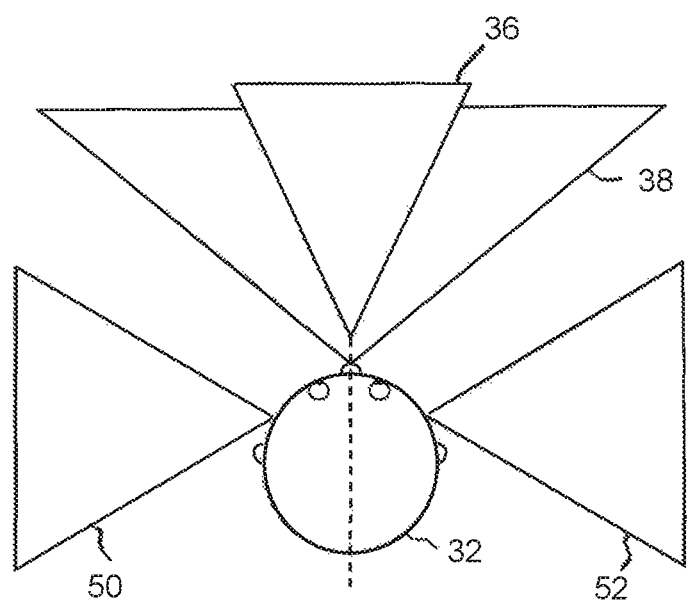

Fiq. 6 is a schematic view of a situation in which the driver of the vehicle looks to the side of the vehicle according to a different angle; and FIG. 7 is a schematic view of an assistance device according to an embodiment of the invention.

DETAILED DESCRIPTION OF THE PREFERRED EMBODIMENTS

The invention relates to a device and a method for assisting in the driving of a vehicle, one of the objectives of which is to compute the transmission coefficient of a screen with variable transmission. This screen with variable transmission is arranged in the field of view of the driver of the vehicle, between the latter and the road scene.

According to different embodiments of the invention, the screen with variable transmission can comprise:
- an actual screen, placed between the driver and the windshield, for example that can be folded back in the manner of a sun shield,
- the windshield itself, or
- a pair of spectacles, worn by the driver, like sunglasses or corrective glasses.

The level of transparency of the screen with variable transmission is defined by a transmission coefficient of the screen with variable transmission, driven by the assistance device, and varying between a maximum value corresponding to a maximum transparency of the screen, and a minimum value corresponding to a minimum transparency of the screen. The modification of the transmission coefficient thus leads to a modification of the transparency of the screen with variable transmission, thus enabling the driver to benefit from a modification of the perceived brightness.

Consequently, the embodiment described will use the spectacles 10 as screen with variable transmission, without in any way reducing the scope of protection to such an embodiment.

Figure 1:
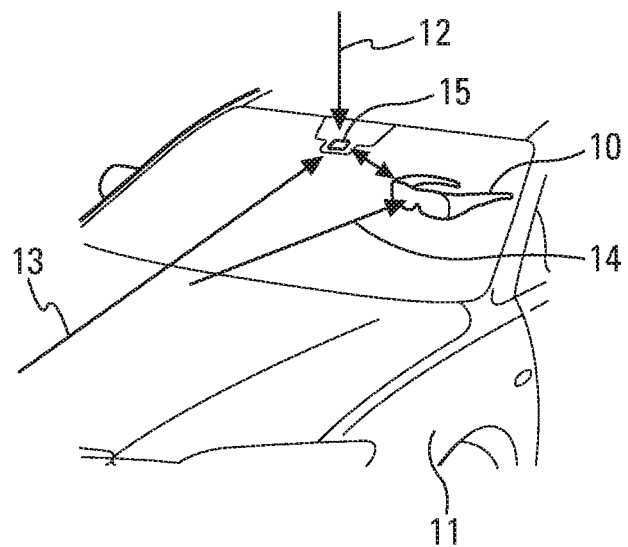
FIG. 1 is a schematic view of the front of a vehicle and of an assistance device according to the invention.

FIG. 1 schematically represents the front of a vehicle 11 comprising sensors intended to recover the information necessary to the computation of the transmission coefficient of the spectacles 10. It will be observed that the multiplicity of sensors makes it possible to take into account brightness data originating from different directions 12, 13 and 14 and therefore allowing for a more appropriate computation of the transmission coefficient. Thus, referring to FIG. 1, a brightness, rain and temperature sensor 15 situated level with the top of the windshield, preferably level with the attachment of a rear view mirror inside the windshield, picks up the light originating from a number of directions 12, 13 and 14, for example and as represented, from the axis of the vehicle 11 toward the front, and from above the vehicle 11. A second sensor, situated on the spectacles 10, makes it possible to pick up the light in the direction of the gaze or at the very least of the head of the driver.

Figure 2:
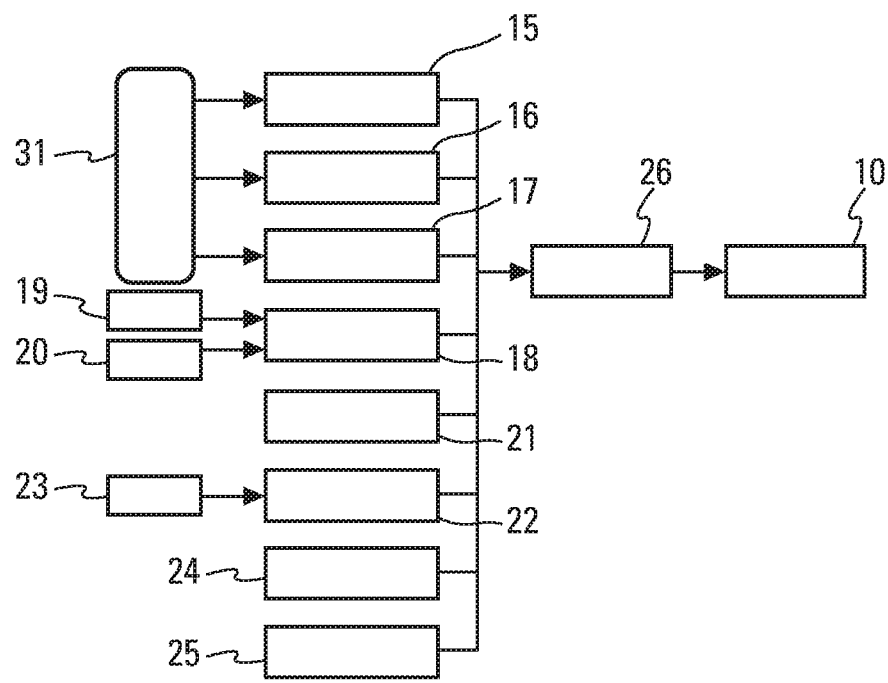
FIG. 2 is a schematic view of an assistance device according to the invention.

FIG. 2 schematically represents a device according to the invention. The device comprises a multitude of sensors, here:
- a photodiode 16 situated on the spectacles 10, recovering brightness data in the direction of the gaze of the driver;
- the brightness, rain and temperature sensor 15 (also referred to as RLT, Rain Light Tunnel, sensor), recovering brightness data originating from a number of directions 12, 13 (for example above the vehicle (direction 12) and facing the vehicle (direction 13)), and weather condition data;
- a camera 17, making it possible to recover brightness data in a number of directions;
- a navigation system 18, for example a GPS, recovering geolocation data 19 and making it possible to correlate it with mapping data 20, for example to determine whether the vehicle 11 is in a town, in the country, in a tunnel, etc;
- a time band data recovery system 21, preferably synchronized with a time server on a reference time, for example by using the GPS 18, in order to determine whether the driving is being done in daytime or at night;
- a weather data recovery system 22, connected for example to the internet 23, in order to determine the weather conditions (for example sunny, cloudy, rainy, etc.) in the area in which the vehicle 11 is traveling;
- a system for detecting the orientation of the head of the driver 24, comprising, for example, accelerometers and/or gyroscopes;
- a system for measuring the speed of the vehicle 25, incorporated conventionally in most vehicles.

In other words, the first three sensors 15, 16 and 17 pick up the brightness 31 originating from a number of directions.

A vehicle 11 equipped with a device according to the invention will advantageously comprise some of these sensors, preferably all, and possibly other sensors not cited here.

These recovered data are then processed, for example in a microcontroller 26 which also controls, here, the driving of the transmission coefficient of the spectacles 10. The processing has a number of objectives: a first objective is to determine from the recovered data a situation in which the vehicle 11 is located; a second objective is to combine the recovered data to compute the transmission coefficient, preferably by weighting the recovered data according to the determined situation. In one embodiment of the invention, the microcontroller 26 is situated in the spectacles 10 and the data recorded by the other sensors are transmitted by virtue of wireless links.

The determination of the situation in which the vehicle 11 is situated makes it possible to adapt the computation of the transmission coefficient according to external elements influencing the type and the significance of the outside brightness. For example, a same brightness originating from the lighting of a passing vehicle will not provoke the same effect on the driver according to whether it happens in daytime or at nighttime. Thus, the device determines the situation in which the vehicle 11 is situated, according to a combination of external elements representative of the type of driving such as: daytime driving, nighttime driving or driving when the sun is rising or setting, driving in a town, in the country or in a tunnel, sunny, cloudy or rainy weather, engine on or not, driver in the car or not. The situations that can be determined depend on the recovered data and therefore on the different sensors present on the vehicle 11.

Another important information item that might be involved in the situation is the orientation of the head of the driver. According to the embodiment in which the screen with variable transmission is a pair of spectacles 10, a brightness sensor 16 is advantageously placed on these spectacles 10, as presented in FIG. 1, so as to recover the brightness data as close as possible to the eyes of the driver and in the direction of his or her gaze. Thus, if the driver orients his or her head in a direction other than in the axis of the vehicle 11, a greater significance will be accorded to the sensor 16 situated on his or her spectacles 10. The aim of this is not to reduce his or her visibility if a strong brightness is detected in the axis of the vehicle 11 although the driver is looking in the direction of an area which is weakly lit, in which case the strong brightness in the axis of the vehicle 11 will not be a hindrance.

Once the situation of the vehicle 11 is determined, the assistance device assigns a weight to the recovered data according to the situation determined in the previous step. The weights thus assigned make it possible to weight the data to perform the computation of the transmission coefficient. Thus, it is possible to assign each datum used for the computation a different significance according to the situation.

For example, in the case where the driver is looking to the rear of the vehicle 11 to perform a reverse, the data originating from a brightness sensor situated at the front of the vehicle 11, such as the brightness, rain and temperature sensor 15 or the camera 17, are of very little interest. The device then takes account mainly of the data originating from a sensor situated at the rear of the vehicle 11, such as a reversing camera, and/or the sensor 16 present on the spectacles 10.

In another example, when the vehicle 11 enters into a tunnel, the sensor 16 situated on the spectacles 10 is no longer sufficient to estimate the brightness outside the vehicle 11. More weight is then granted to the brightness, rain and tunnel sensor 15 situated on the windshield of the vehicle 11, or to the camera 17.

Finally, in the case where the driver is outside the vehicle 11 and/or the engine is stopped, the predominant sensor is the sensor 16 situated on the spectacles 10. In the embodiment in which the microcontroller 26 is situated in the spectacles 10, the microcontroller 26 then receives only the information originating from the sensor situated in the spectacles 10. Thus, it deduces therefrom that the driver is outside the vehicle 11.

Figure 3:
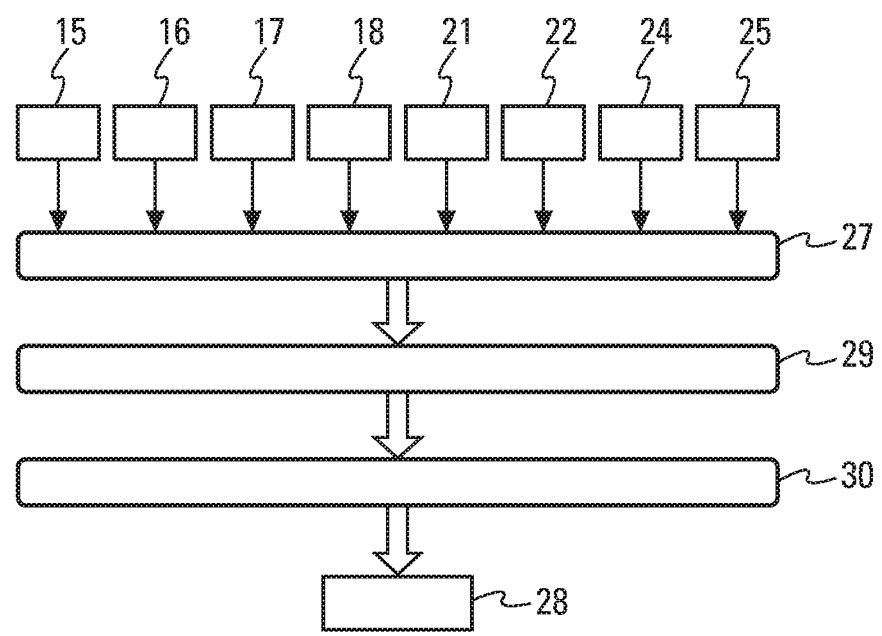
FIG. 3 is a schematic view of an assistance method according to the invention.

The operation of the assistance device according to the invention and the assistance method according to the invention are detailed in FIG. 3. The data from the different sensors 15, 16, 17, 18, 21, 22, 24 and 25 described previously are recovered in a step of recovery 27 of data representative of the environment in which the vehicle 11 is situated. The last step represented is the step of driving 28 the transmission coefficient of the screen with variable transmission. Between these two steps, there is a step 29 of taking into account of the data recovered in the recovery step 27 and a step of computation 30 of the transmission coefficient by combination of the data.

The recovery step 27 consists, for the microcontroller 26, in recovering the data transmitted to it by the different sensors, preferably via a wireless connection when the microcontroller 26 is located in the spectacles 10. Once the data are recovered, the step 29 of taking into account comprises a step of determination (not represented) of the situation in which the vehicle 11 is situated. The step of determination of the situation will be able to be based on an estimation of the knowledge provided by the different data from the different sensors 15, 16, 17, 18, 21, 22, 24 and 25. For example, in case of strong brightness picked up by the RLT sensor 15 originating from above the vehicle 11, the microcontroller 16 will assume that the weather conditions are strong sunlight. If this assumption is confirmed by the weather conditions recovered on the internet, the microcontroller 26 will consider that the driving is in daytime and in sunny weather. Otherwise, it will be necessary to take account of other data, such as, for example, the brightness recorded by the other sensors such as the camera 17.

Once the situation in which the vehicle 11 is situated is determined, the step of computation 30 of the transmission coefficient follows. This step of computation 30 comprises a step of assignment (not represented) of a weight to all or part of the recovered data as a function of the situation of the vehicle 11 determined in the determination step described previously. The weight assigned to each datum will be able in particular to depend on its significance estimated in the brightness computation. Generally, the assignment of the weights depends on the combination strategy retained.

The weighting of the data and their weighting can advantageously use different methods derived from the so-called theory of beliefs. In particular, the Dempster-Shafer theory which uses the Dempster-Shafer equation gives probative results.

Once the weights are assigned to each datum, the microcontroller 26 computes the transmission coefficient by taking into account the weighted data determined in the preceding step. This computed transmission coefficient is then used to drive the screen with variable transmission.

An example of how the method proceeds is detailed hereinbelow. The data recorded by the various sensors 15, 16, 17, 18, 21, 22, 24 and 25 are recovered by the microcontroller 26. Some of these data will make it possible to determine the situation of the vehicle 11. For example, the GPS system 18 indicates that, by virtue of the consultation of mapping data 20, the vehicle 11 is located on a country road, and by virtue of the time stamping of the geolocation data 19, that the time is 2:00 PM in the time zone where the vehicle 11 is located. The consultation of the weather data recovery system 22 indicates that the weather is sunny, and the rain or RLT sensor 15 does not detect any rain. The situation is therefore a combination of these elements: driving in daytime, on a country road, in sunny weather.

The microcontroller 26 weights the data originating from the brightness sensors according to predetermined settings.

The weights are, in this example: 70% for the sensor 16 on the spectacles 10, 80% for the vertical brightness (coming from above) from the RLT sensor 15, 80% for the horizontal brightness (coming from in front) from the RLT sensor 15, and 80% for the camera 17.

The brightness data are expressed in this example by a value from 0 to 100 (which can be expressed as a percentage), respectively representing the minimum brightness measurable by the sensor and the maximum brightness measurable by the sensor. The sensors record, for example: 30% for the sensor 16 of the spectacles 10, 70% for the RLT sensor 15 vertically, 50% for the RLT sensor 15 horizontally, 50% for the camera 17. By weighting these values by the weights expressed above, the following values are obtained (by product of percentages): 21% for the sensor 16 of the spectacles 10, 56% for the RLT sensor 15 vertically, 40% for the RLT sensor 15 horizontally, 40% for the camera 17. The average of these values gives a value of 39% corresponding to the average brightness intensity measured. Thus, to improve the visibility of the driver, it is necessary to lower this brightness by lowering the transmission coefficient of the spectacles 10, and therefore the transparency, to 100−39=61%. The microcontroller 26 therefore sets, in this example, the transmission coefficient of the spectacles 10 to this value of 61%. In this example, the brightness/transparency coefficient correlation is deliberately simplified by a simple linear equation y=100−x with y being the transmission coefficient and x the average brightness intensity measured, but the equation can be more complex, with in particular different extreme values for it not to be possible for the transmission coefficient to be set at 0% which would correspond to a screen with variable transmission that is totally opaque which cannot be envisaged for motor vehicle driving.

According to one embodiment, the device makes it possible to adapt the transparency of the screen with variable transmission according to the fields of view of a sensor situated at the front and in the axis of the vehicle 11 (such as the camera 17 or of the RLT sensor 15) and of the sensor 16 situated on the spectacles 10, and according to the orientation of the head of the driver. The fields of view of the sensors can be broken down into horizontal field of view and vertical field of view FIGS. 4 to 7 represent the horizontal fields of view of the sensors according to different situations. The characteristics relative to these horizontal fields of view and the adaptations of the transparency of the screen with variable transmission by the device as a function of these horizontal fields of view can be transposed equivalently to the vertical fields of view of the sensors, not represented in the figures, with angle values that can be different.

Figure 4:
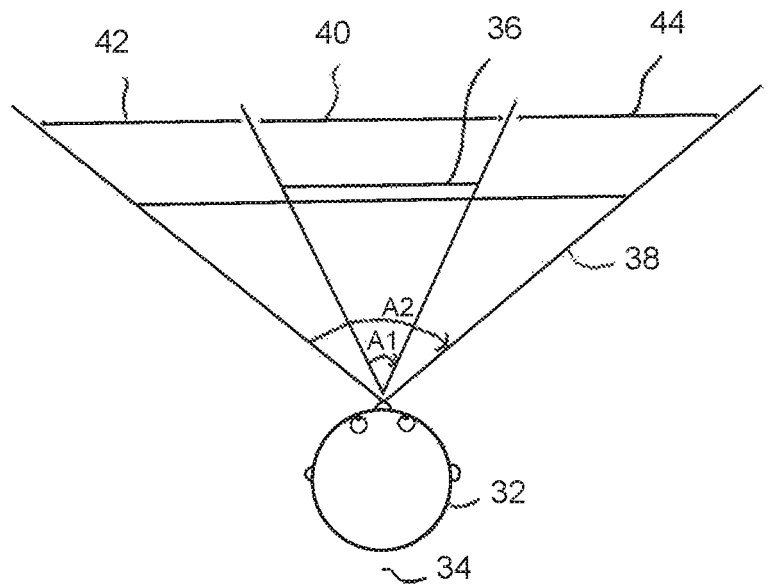
FIG. 4 is a schematic view of a situation in which the driver of the vehicle looks toward the front of the vehicle.

FIG. 4 schematically represents the head 32 of a driver along the axis 34 of the vehicle 11. The first horizontal field of view of a sensor situated at the front and in the axis 34 of the vehicle 11 is represented by a first triangle 36 and the second horizontal field of view of the sensor situated on the spectacles 10 is represented by a second triangle 38. The angle A1 of the first horizontal field of view 36 is, for example, approximately 50° (or ±25° on either side of the axis of the vehicle 11), and the angle A2 of the second horizontal field of view or second triangle 38 is, for example, approximately 120° (or ±60° on either side of the axis 34 of the vehicle 11). Ideally, the second horizontal field of view 36 corresponds to the field of view in which the human eye, here the eye of the driver, is likely to be dazzled.

The system for detecting the orientation of the head 32 of the driver makes it possible for the device to know the orientation of the head 32 of the driver, and therefore the orientation of the sensor 16 situated on the spectacles and thus of the second horizontal field of view 38.

Figure 5:
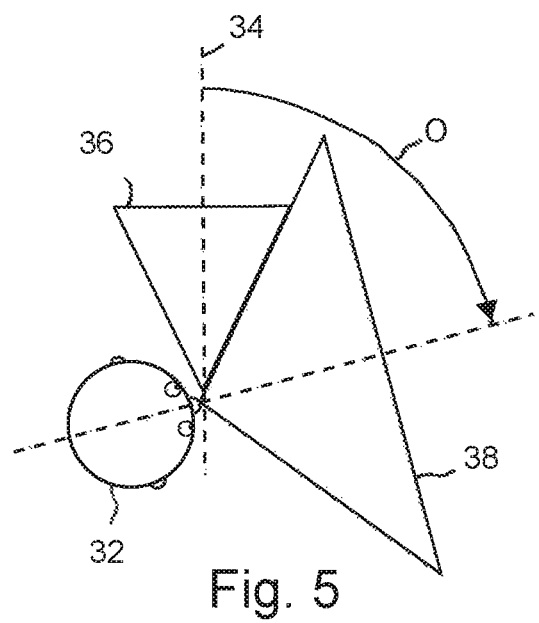
FIG. 5 is a schematic view of a situation in which the driver of the vehicle looks to the side of the vehicle.

When the system for detecting the orientation of the head of the driver 24 detects when the driver turns his or her head 32, as represented in FIG. 5, the second horizontal field of view 38 is moved by an angle O relative to the axis 34 of the vehicle 11. The device detects this movement by detection of the orientation of the head 32.

The level of transparency is determined as a function of the level of glare (or of brightness, depending on the type of sensor used), computed in the field of view of the driver. The sensor situated at the front and in the axis of the vehicle 11 is a sensor whose information is more robust than the sensor 16 situated on the spectacles 10 because there is no risk of it being obstructed by a windshield of the vehicle 11 or by headgear worn by the driver of the vehicle 11. Thus, in the situation represented in FIG. 4, the sensor situated at the front and in the axis of the vehicle 11 is the only one taken into account in the computation of the level of transparency in the zone 40 corresponding to the first horizontal field of view 36. Nevertheless, the sensor 16 situated on the spectacles 10 has a second horizontal field of view 38 wider than the first horizontal field of view 36: thus, only the glare data situated in the zones 42 and 44 of the second field of view 38 which do not form part of the first horizontal field of view 36 are taken into account.

In the situation represented in FIG. 5, the second horizontal field of view 38 is displaced via an angle O that is sufficiently great for the two horizontal fields of view 36, 38 not to be superimposed. Thus, as the second horizontal field of view 38 is substantially representative of the field of view in which the driver is likely to be dazzled, the sensor 16 situated on the spectacles 10 is the only one taken into account in the computation of the level of transparency. In practice, the sensor 16 situated on the spectacles 10 is the only one taken into account if O>(A1+A2)/2, that is to say, in this example, (50+120)/2=85°. This situation is commonplace when checking for vehicles that might be arriving alongside the vehicle 11 or for checking dead angles.

Figure 6:
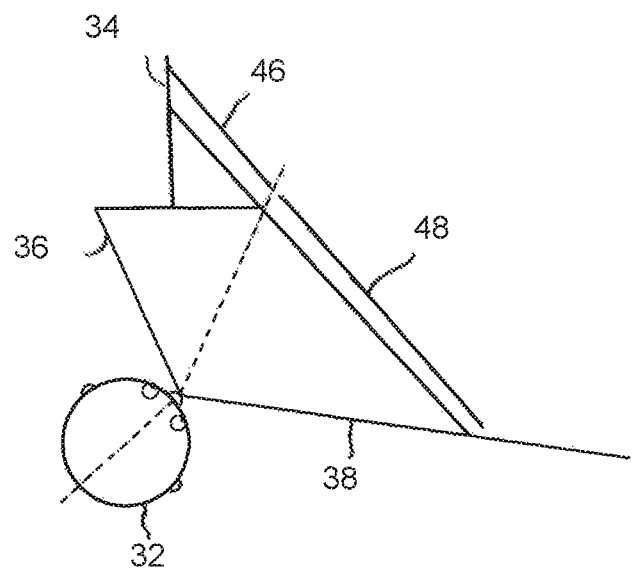

FIG. 6 represents a situation in which the driver orients his or her head 32, at approximately 45°. The fields of vision 36, 38 of the two sensors are therefore superimposed partially over a zone 46. As explained previously, in this zone 46, only the data originating from the sensor situated at the front and in the axis of the vehicle 11 are taken into account. In the zone 48 of the second horizontal field of view 38, the data originating from the sensor 16 situated on the spectacles 10 are taken into account.

According to one embodiment of the invention, to make it possible to avoid having the driver being dazzled by a source of glare regardless of the position of the source in his or her field of view, the computation of the variable transmission coefficient is performed as a function of the most significant glare measured by the sensors in his or her field of view.

According to one embodiment of the invention represented in FIG. 7, to improve the performance levels of the device in case of a rapid change of the orientation of the head 32 of the driver, additional sensors can be used to cover zones outside the field of view of the driver in order to be able to anticipate any glare originating from these zones if the driver orients his or her head 32 in the direction of these zones. For example, two additional glare sensors may be present, each placed on the arms of the spectacles 10 covering the zones 50, 52 situated to the left and to the right of the head 32 of the driver, outside of his or her field of view. If the driver does not changethe orientation of his or her head 32, these additional sensors measure the glare in these zones 50, 52 and these measurements are not involved in the computation of the transmission coefficient of the screen with variable transmission, which is only dependent on the values measured in the first horizontal field 36 and the second horizontal field 38 of view. If the driver changes the orientation of his or her head 32 to one of the zones 50, 52 covered by these additional sensors, the device will take into account the data recorded by these sensors before the rotation of the head 32 to anticipate the computation of the transmission coefficient of the screen with variable transmission.

In one embodiment of the invention, the screen with variable transmission can be coupled to a pulsed lighting, in synchronism or not depending on the situations.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An assistance device for assisting in the driving of a motor vehicle, comprising a screen with variable transmission arranged between a road scene in front of said motor vehicle and a driver of said motor vehicle, said assistance device comprising a number of sensors suitable for recovering data representative of an environment in which said motor vehicle is located, said assistance device being configured to drive a transmission coefficient of said screen with variable transmission, wherein said assistance device is configured to take account of data recovered by said number of sensors and to compute said transmission coefficient by combining said data;
   wherein a first of said number of sensors is a sensor configured to measure a brightness in a direction of an axis of said motor vechicle and a second of said number of sensors is a sensor configured to measure a brightness in another direction, said assistance device being configured to take account an orientation of a head or an eye of driver and perform said computation of said transmission coefficient as a function of data recorded by said first and said second number of sensors and as a function of said orientation of said head of said driver.

2. The assistance device as claimed in claim 1, wherein said number of sensors are suitable for recovering said data representative of an environment out of one or more of the following types of data:
   atmospheric conditions;
   a road environment; and
   an environment of said driver.

3. The assistance device as claimed in claim 1, wherein said assistance device is suitable for determining a situation in which said motor vehicle and/or said driver is located from all or part of said recovered data.

4. The assistance device as claimed in claim 3, wherein said assistance device is suitable for determining said situation from data recovered out of the following data:
   atmospheric conditions;
   a road environment; and
   an environment of said driver.

5. The assistance device as claimed in claim 3, wherein said assistance device is configured to assign a weight to all or part of said recovered data as a function of said situation of said motor vehicle and to weight said recovered data by their corresponding weight in a computation of said transmission coefficient.

6. The assistance device as claimed in claim 1, wherein said screen with variable transmission comprises spectacles and said second sensor is situated on said spectacles.

7. The assistance device as claimed in claim 1, comprising a pulsed lighting, said assistance device being configured to drive said pulsed lighting, in a first mode in synchronism with said transmission coefficient, and, in a second mode, independently of said transmission coefficient.

8. An assistance method for assisting in the driving of a motor vehicle, said motor vehicle being equipped with a screen with variable transmission arranged between a road scene in front of said motor vehicle and a driver of said motor vehicle, said method comprising a step of recovery of data by a plurality of sensors, said data being representative of an environment in which said motor vehicle is located, and a step of driving a transmission coefficient of said screen with variable transmission, wherein said method comprises a step of taking into account of data recovered in said recovery step and a step of computation of said transmission coefficient by combination of said data;
   wherein a first of said plurality of sensors is a sensor configured to measure a brightness in a direction of the axis of said motor vehicle and a second of said number of sensors is a sensor configured to measure a brightness in another direction, said assistance method taking into account an orientation of a head or an eye of a driver and performing said computation of said transmission coefficient as a function of data recorded by said first and said second of said plurality of sensors and as a function of said orientation of said head of said driver.

9. The assistance method as claimed in claim 8, wherein said data representative of said environment are chosen from one or more of the following types of data:
   atmospheric conditions;
   a road environment; and
   an environment of said driver.

10. The assistance method as claimed in claim 8, wherein said method comprises a step of determination of a situation in which said motor vehicle is located from said recovered data.

11. The assistance method as claimed in claim 10, wherein said step of determination of said situation is performed on a basis of said data recovered out of the following data:
    atmospheric conditions;
    a road environment; and
    an environment of said driver.

12. The assistance method as claimed in claim 10, wherein said method comprises a step of assignment of a weight to all or part of said recovered data as a function of said situation of said motor vehicle and in that it comprises a step of weighting of said recovered data by their corresponding weight for a computation of said transmission coefficient.

13. The method as claimed in claim 8, wherein said method comprises a first step of driving a pulsed lighting of said motor vehicle, in synchronism with a driving of said transmission coefficient, and a second step of driving said lighting independently of said driving of said transmission coefficient.

14. The assistance device as claimed in claim 2, wherein said assistance device is suitable for determining a situation in which said motor vehicle and/or said driver is located from all or part of said recovered data.

15. The assistance device as claimed in claim 4, wherein said assistance device is configured to assign a weight to all or part of said recovered data as a function of said situation of said motor vehicle and to weight said recovered data by their corresponding weight in a computation of said transmission coefficient.

16. The assistance device as claimed in claim 2, wherein a first of said number of sensors is a sensor configured to measure a brightness in the axis of said motor vehicle and a second of said number of sensors is a sensor configured to measure a brightness in another direction, said assistance device being configured to take account of an orientation of a head of a driver and perform said computation as a function of data recorded by said first and said second number of sensors and as a function of said orientation of said head of said driver.

17. The assistance method as claimed in claim 9, wherein said method comprises a step of determination of a situation in which said motor vehicle is located from said recovered data.

18. The assistance method as claimed in claim 11, wherein said method comprises a step of assignment of a weight to all or part of said recovered data as a function of said situation of said motor vehicle and in that it comprises a step of weighting of said recovered data by their corresponding weight for a computation of said transmission coefficient.

* * * * *